United States Patent [19]

Takada, deceased

[11] 3,910,525

[45] Oct. 7, 1975

[54] AUTOMATIC LOCKING SAFETY BELT REEL

[75] Inventor: Takezo Takada, deceased, late of Tokyo, Japan, by Juichiro Takada, legal representative authorized heir

[73] Assignee: Takata Kojyo Co., Ltd., Tokyo, Japan

[22] Filed: Nov. 16, 1973

[21] Appl. No.: 416,485

[30] Foreign Application Priority Data
Nov. 18, 1972  Japan.............................. 47-115221

[52] U.S. Cl. .......................................... 242/107.4
[51] Int. Cl............................................. B65h 78/48
[58] Field of Search ....... 242/107 R, 107.4, 107 SB; 297/388; 280/150 SB

[56] References Cited
UNITED STATES PATENTS

| | | | |
|---|---|---|---|
| 2,845,233 | 2/1958 | Pfankuch........................ | 242/107.4 |
| 3,180,456 | 4/1965 | Whittingham ............... | 242/107.4 X |
| 3,632,056 | 1/1972 | Hibbard.......................... | 242/107.4 |
| 3,695,545 | 10/1972 | Peters............................. | 242/107.4 |

Primary Examiner—Edward J. McCarthy
Attorney, Agent, or Firm—Wolder & Gross

[57]  ABSTRACT

An automatic locking safety belt take-up reel includes a shaft which is spring biased in a belt take-up direction and on which are affixed a belt wind-up reel, a pair of spaced ratchet wheels and a first gear. Rotatable in the shaft on opposite sides and proximate the first gear are an actuating lever and a second gear similar to the first gear, the lever supporting a rotatable pinion engaging both gears, so that a rapid acceleration of the shaft causes translational movement of the gear by reason of the inertia of the second gear to rock the lever from a spring retracted position. The lever is linked to a pair of pawls registering with the ratchet wheels so that rocking of the lever shifts the pawls into locking engagement with the ratchet wheels to prevent belt withdrawal.

7 Claims, 4 Drawing Figures

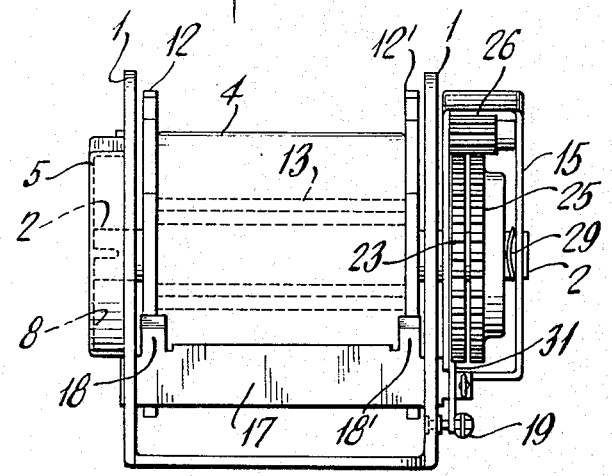
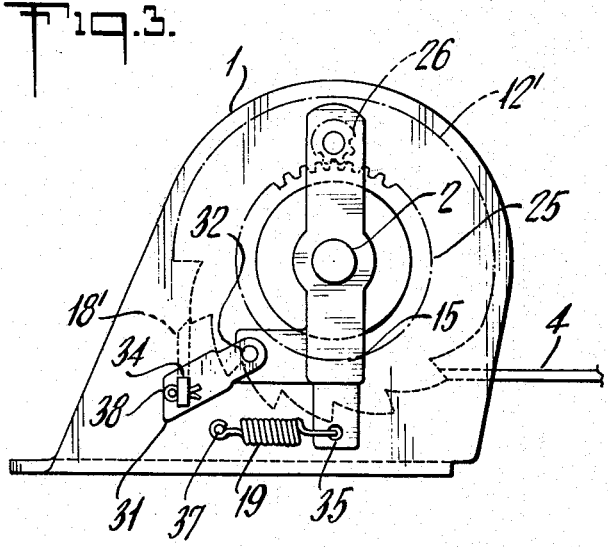
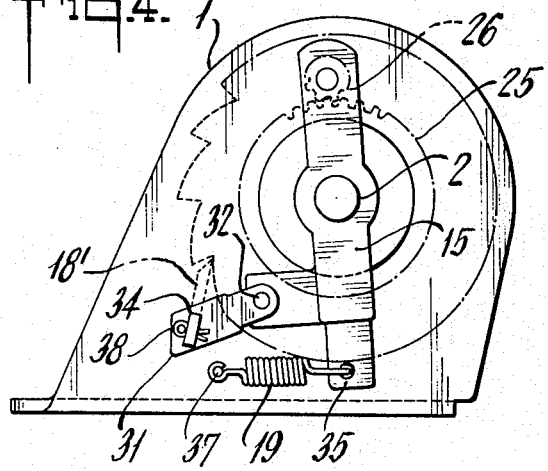

AUTOMATIC LOCKING SAFETY BELT REEL

BACKGROUND OF THE INVENTION

The present invention relates generally to improvements in vehicle safety belt devices and it relates more particularly to an improved automatic locking safety belt take-up reel.

In securing an occupant in a vehicle seat it is a common practice to provide a belt take-up reel which is spring biased to take up the safety belt and permits the free withdrawal of the belt, except under collision or accident conditions, so that the occupant, under normal conditions, is permitted free movement, but in the event of a collision or accident, is securely restrained. Among the collision responsive automatic locking belt take-up reels which have been heretofore employed and proposed, are those which are actuated to a belt withdrawal locking condition upon a sharp, short rapid withdrawal of the belt consequent to a collision, causing high forward acceleration of the seat occupant. However, the known belt reels of this type possess numerous drawbacks and disadvantages. They are generally awkward and bulky devices which are highly complicated and difficult, and expensive to manufacture. They are difficult and inconvenient to install, particularly in the limited space available in the vehicle and they are unreliable and of limited versatility and adaptability.

SUMMARY OF THE INVENTION

It is a principal object of the present invention to provide an improved vehicle safety belt device.

Another object of the present invention is to provide an improved vehicle safety belt take-up reel.

Still another object of the present invention is to provide an improved automatically self locking safety belt take-up reel.

A further object of the present invention is to provide an improved safety belt take-up reel of the type which locks against belt withdrawal upon a sharp, short, rapid withdrawal of the safety belt.

Still a further object of the present invention is to provide a device of the above nature characterized by its reliability, ruggedness, simplicity, compactness, low cost and ease and convenience of installation and great versatility and adaptability.

The above and other objects of the present invention will become apparent from a reading of the following description taken in conjunction with the accompanying drawings, which illustrate a preferred embodiment thereof.

In a sense, the present invention contemplates the provision of an improved automatic locking safety belt take-up reel comprising a shaft spring biased to rotate in a belt take-up direction, a belt winding reel mounted on and rotatable with the shaft, a sprocket wheel mounted on and rotatable with the shaft, a pawl supported for movement between an advanced position engaging and locking the ratchet wheel and a retracted ratchet wheel disengage position, a first gear mounted on and rotatable with the shaft, a second gear proximate the first gear and freely rotatable on the shaft, a pinion member engaging both gears, and actuating means responsive to the translational movement of the pinion member for advancing the pawl to its ratchet wheel locking position to prevent belt withdrawal rotation of the reel.

In its preferred form, the improved reel includes a U-shaped mounting bracket, the shaft extending between and being journalled to the bracket side plates. The reel is located between the side plates, ratchet wheels are secured to opposite sides of the reel proximate the side plate inside faces. A rockable cross bar extends between the side plates and is provided with pawls which register with the ratchet wheels. The gears are located along the outside face of a side plate and an actuating lever is rockably supported by the shaft proximate gears and rotatably supports the pinion member. A radial arm is connected to the cross bar and is pin connected to the actuating lever which is spring biased to retract the pawls and the coupled lever.

The improved take-up reel is reliable, rugged, simple, compact, easy and convenient to install, and of great versatility and adaptability.

BRIEF DESCRIPTION OF THE DRAWINGS

FIG. 2 is an end elevational view of the assembled reel;

FIG. 3 is a side elevational view thereof with the reel illustrated in unlocked condition; and FIG. 4 is a view similar to FIG. 1 with the reel illustrated in locked condition.

DESCRIPTION OF THE PREFERRED EMBODIMENT

Figure 1:
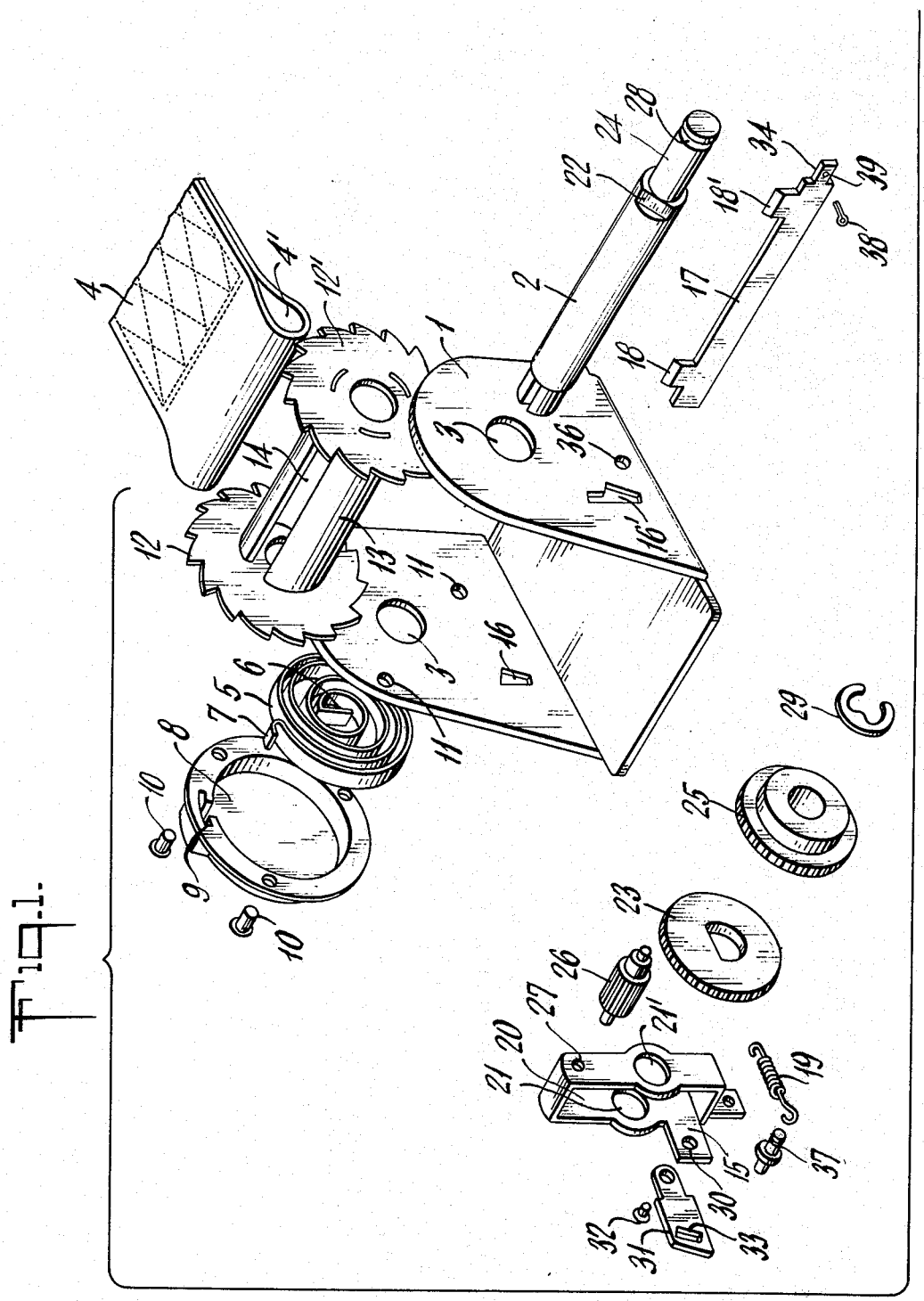
FIG. 1 is an exploded perspective view of an automatic self-locking take-up reel embodying the present invention.

Referring now to the drawings which illustrate a preferred embodiment of the present invention, the reference numeral 1 generally designates a mounting bracket which is of U-shaped configuration, including a bottom cross web and upright parallel side plates. A shaft 2 is journalled in transversely aligned openings 3 formed in the bracket side plates and projects beyond the side plates. A vehicle safety belt 4 terminates in a looped portion 4' which engages the shaft 2 between the bracket side plates. A tubular reel or drum 13 having a longitudinal slot 14 encircles the looped portion with the belt 4 projecting through slot 14 and rotates in unison as an integral unit with shaft 2. Secured to the opposite ends of reel 13 and rotatable therewith are similarly shaped and oriented coaxial ratchet wheels 12 which are proximate the confronting faces of the bracket side plates and have the teeth sharp shoulders facing in the belt take-up direction of the reel. The bracket base web is provided with an opening to facilitate its mounting in any desired position in the vehicle.

A spiral coil wind-up spring 5 is disposed along an outer face of a bracket side coaxial with shaft 2 and terminates at its inner end in a diametric arm 6 which engages a diametric slot formed in the corresponding end of the shaft 2. The spring 5 terminates at its outer end in a hook portion 7 which nests in and is engaged by a recess 9 formed in the peripheral wall of a closure cap 8 housing the spring 5 and including a peripheral flange abutting the outer face of the respective bracket side wall and secured thereto by fastening projections 10 extending from the flange into locked engagement with openings 11 in the bracket side wall. The spring 5 is coiled to resiliently urge the shaft 2 and reel 13 to rotate in a belt winding or take-up direction.

Formed in the bracket side plates below and forwardly of holes 3 are a pair of transversely aligned inverted trapezoidal openings 16 and 16', the opening 16' having a vertical slot extension. A cross bar 17 extends between and engages the openings 16 and 16' so as to be rockable about its longitudinal axis a limited angle. A pair of upwardly projecting pawl elements 18 and 18' are integrally formed with cross bar 17 proximate its opposite ends and are rockable with the cross bar 17 between an advanced position, as shown in FIG. 4, engaging respective ratchet wheels 12 and a retracted position disengaging the ratchet wheels, as shown in FIG. 3.

The section of the shaft 2 opposite the slotted end thereof includes, outside the outer face of the bracket respective side plate, a flatted portion 22 spaced outwardly of the bracket side plate and terminates in a coaxial stub shaft 24 of reduced diameter and provided proximate its outer end with a peripheral groove 28. An acuating lever 15 includes a pair of transversely spaced parallel longitudinally extending arms 20, having transversely aligned openings 21 and 21' formed therein intermediate their ends the openings 21 and 21' rotatable engaging the shaft 2 and 24 so that the lever 15 is rockable about the axis of shaft 2. The upper and lower ends of arms 20 are joined by cross webs.

A first gear 23 having a bore mating shaft flatted portion 22 engages the shaft flatted portion and is rotatable with shaft 2 and is located between lever arms 20. A second relatively heavy high inertia gear 25 having the same toothed periphery as gear 23 is disposed side by side with gear 23 between lever arms 20 and is freely rotatable on stub shaft 24. An axially elongated pinion gear 26 is located and extends between the upper ends of lever arms 20 and terminates in coaxial stub shafts which are journalled in aligned openings 27 formed in the upper parts of lever arms 27. The pinion 26 is in meshing engagement with both gears 23 and 25 and the assembly is retained in shaft 2 by a split lock ring 29 engaging the groove 28.

An outer end of cross bar 17 terminates in a longitudinally projecting rectangular coupling tongue 34 having an aperture 39 formed therein proximate its end. An arm 31 is swingably connected to a leg projecting forwardly from the lower end of a lever arm 20 to a pivot pin 32 engaging an opening 30 in the forwardly projecting leg and a corresponding opening in the rear portion of arm 31. A rectangular opening 33 is formed in the forward end of arm 31 and matingly engages the tongue 34 so as to be rockable with cross bar 17 and is locked to tongue 34 by a cotter pin 38 engaging the aperture 39.

A pin 37 is screwed into a threaded opening proximate the lower edge of a bracket side plate and engages one hooked end of a helical tension spring 19, the other hooked end thereof engaging an aperture 35 formed in a tongue depending from and coplanar with the inner lever arm 20 to resiliently urge or bias the lever 15 clockwise which correspondingly resiliently biases the pawl elements to their retracted ratchet disengage positions by way of arm 31.

Considering now the operation of the improved automatic locking reel described above, FIG. 3 illustrates the actuating lever 15 in its normal state of use, and FIG. 4 shows the actuating lever 15 in the position it assumes in a collision or other emergency. When the belt 4 is withdrawn at a rate corresponding to the normal movement of the belt wearer, the pinion gear member 26 is rotated by rotation of the spur gear 23 while the actuating or pawl-operating lever 15 is held stationary in the position shown in FIG. 3 since the pinion only rotates to rotate gear 25 by overcoming its inertia. However, when the belt 4 is jerked out quickly with a sudden forward movement of the belt wearer as in the event of occurrence of a collision or other abnormal situation, the spur gear 23 is caused to rotate rapdily but rotation of the pinion gear 26 is checked by the damping action of the high inertia damping gear 25 so that the pinion gear 26 cannot freely rotate in obedience to the rotation of the spur gear 23, consequently effecting a translational or planetary movement about the axis of shaft 2, causing the actuating lever 15 to slightly rock about the shaft 2 to the position shown in FIG. 4 by overcoming the pulling force of the coil spring 19, and this in turn effects the rocking of the cross bar 17 through the coupling arm 31 to advance the pawl elements 18, 18' into engagement with the respective ratchets 12, 12' to brake or check the rotation of the shaft 2 and thereby prevent withdrawal of the safety belt so as to restrict the inertial movement of the belt wearer, thereby ensuring his safety.

The mechanism of present invention possesses many practical advantages. Thus, the force imparted to the safety belt 4 in a collision or other abnormal situation is positively sustained by the rigid ratchets and pawls combination, while the number of component parts in the improved mechanism is minimized and the fabrication of such parts is also simplified to thereby achieve substantial miniaturization as well as facilitating the mass production of the device and to also maximize the adaptability of the device of the limited space in a vehicle or such. Further. The emergency operations can be accomplished with high reliability by the use of quick responsing gearing. Thus, the device of the present invention, through a very simple mechanism, displays a great superiority in ensuring the safety of the belt wearer.

While there has been described and illustrated a preferred embodiment of the present invention, it is apparent that numerous alterations, ommissions and additions may be made without departing from the spirit thereof.

I claim:

1. An automatic locking safety belt take-up reel comprising a shaft, a belt winding reel mounted on the rotatable with said shaft, a ratchet wheel mounted on and rotatable with said shaft, a pawl supported for movement between an advanced position engaging and locking said ratchet wheel and a retracted ratchet wheel disengage position spring means biasing said shaft and reel to rotate in a belt wind-up direction, a first gear mounted on and rotatable with said shaft, a second gear proximate said first gear and freely rotatable on said shaft, a rotatable pinion member supported for translational movement and engaging said first and second gears, and actuating means responsive to the translational movement of said pinion member for advancing said pawl to its ratchet wheel locking position to prevent rotation of said reel in a belt withdrawal direction.

2. The reel of claim 1 wherein said actuating means comprises an actuating lever rockably mounted on said shaft for movement between an advanced and a retracted position, said pinion being rotatably mounted on said actuating lever, and means coupling said lever and said pawl to advance and retract said pawl with the advance and retraction of said lever.

3. The reel of claim 2 including spring means urging said lever to its retracted position.

4. The reel of claim 3 wherein said pawl is rockable between its advanced and retracted positions and said coupling means comprises an arm rockable with said pawl and connected to said lever.

5. The reel of claim 2 comprising a U-shaped mounting bracket including a cross plate and parallel side plates, said shaft being journalled to and between and projecting beyond said side plates, said reel being disposed between said side plates and said lever and gears being disposed along an outside face of one of said side plates.

6. The reel of claim 5 including a pair of said ratchet wheels and a pair of said pawls registering with said ratchet wheels, said rachet wheels being disposed along the confronting inside faces of said side plates and comprising a cross piece extending between and rockably supported by said side plates, said pawls being located on and rockable with said cross piece.

7. In a safety belt take-up device adapted for use in a vehicle or the like, said device locking automatically in an emergency and comprising, as mounted in a U-shaped frame, a belt take-up reel, a pair of circular ratchet wheels secured at both ends of said reel, and a pawl passed across both side walls of said U-shaped frame in close adjacency to said ratchet wheels, said reel being mounted on a shaft passed through said U-shaped frame, said shaft carrying at its one end of a box-shaped lever for operating said pawl, said box-shaped lever having provided therein a coil spring for adjusting lever movement, a pawl-coupling plate, a pinion and two gears meshed with said pinion, one of said gears being fixed to and rotatable with said shaft and the other gear being arranged freely rotatable on said shaft, said shaft carrying at its other end a coil spring for winding back the belt when so required, whereby in the event when the vehicle receives a sudden sharp impact force or is canted upon receiving shocks, the pinion which rotates delayed after rotation of the shaft fixing gear owing to the damping action of the gear freely movable on the shaft is urged to move so as to let the pawl-operating lever move slightly by overcoming the pulling force of the lever-controlling coil spring, such movement of said lever being transmitted through the pawl-coupling plate to the pawl to let it operate to stop rotation of the ratchet wheels to check draw-out of the safety belt to thereby protect the belt wearer, whilst the normal state of running of the vehicle, the device allows easy elongation and contraction of the belt so as not to restrict movement of the belt wearer.

* * * * *